United States Patent [19]
Mohri

[11] 3,709,068
[45] Jan. 9, 1973

[54] POWER TRANSMISSION

[76] Inventor: Yohichi Mohri, 402 Baba-cho, Tsurumi-ku, Yokohama, Japan

[22] Filed: Dec. 28, 1970

[21] Appl. No.: 101,996

[30] Foreign Application Priority Data
Dec. 29, 1969 Japan..............................44/857
Feb. 6, 1970 Japan........................45/10279

[52] U.S. Cl.....................................74/866, 74/339
[51] Int. Cl. ...............................................B60k 21/00
[58] Field of Search.................................74/866, 339

[56] References Cited

UNITED STATES PATENTS 3,440,904  4/1969  Kelbel.......................................74/86

Primary Examiner—C. J. Husar
Attorney—McCarthy, Depaoli & O'Brien

[57] ABSTRACT

A multiple speed power transmission for a motor vehicle in which a free wheeling device is provided for effecting a shift from low to high speed drive ratio without disconnecting clutch means from a lower speed The the power transmission includes control means which comprises a manually operated shifting device and a fluid pressure operated servo motor. The fluid pressure operated servo motor is associated with the manually operated shifting device thereby to effect the shift between a plurality of gear ratios either automatically or manually.

5 Claims, 12 Drawing Figures

Fig. 6a

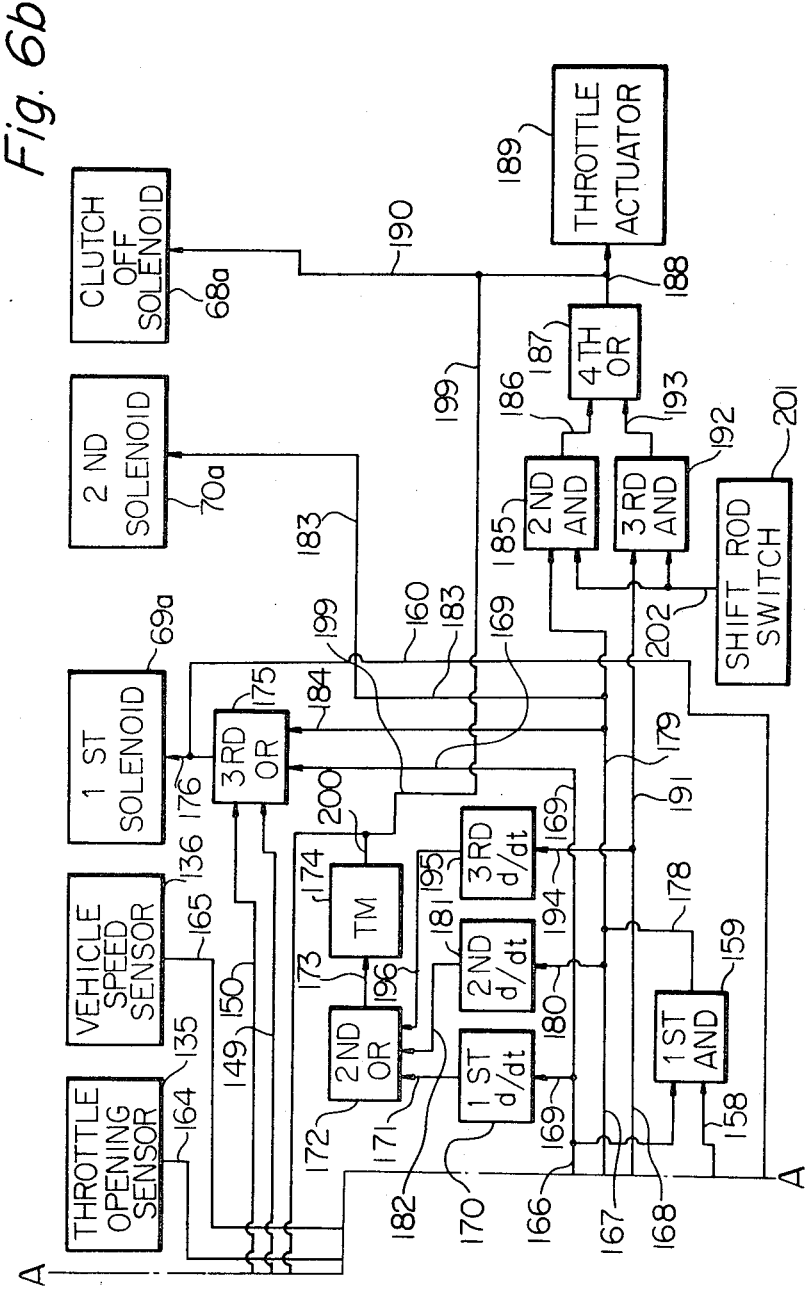

POWER TRANSMISSION

This invention relates to a power transmission, and more particularly to a multiple speed automatic power transmission for a motor vehicle.

Prior automatic power transmissions having planetary gear sets have been successfully employed in motor vehicles for many years to reduce driver's effort in vehicle operation by automatically and efficiently conditioning the transmission between a plurality of gear ratios to meet varying driving conditions. However, such transmissions are much more expensive to produce than the conventional countershaft transmissions, because of the more complicated construction including compounded gearing arrangements and intricate control systems. Thus, it is necessary to provide a transmission which is not only economical to manufacture and easy to assemble and disassemble but which can be readily controlled to provide smooth shifting between a plurality of gear ratios.

It is, therefore, an object of the invention to provide a multiple speed power transmission which is simple in construction and economical to manufacture by the use of a minimum number of parts and control means.

Another object of the invention is to provide a power transmission which is adapted to be operable either automatically or manually.

A still another object of the invention is to provide a power transmission adapted to provide a smooth shifting between a plurality of gear ratios.

A further object of the invention is to provide a power transmission adapted to be controlled by a hydraulic control system which has simplified construction.

A still further object of the invention is to provide a power transmission which includes an electronical control system cooperating with the hydraulic control system to automatically effect shifting between a plurality of gear ratios.

An additional object of the invention is to provide a power transmission having an improved manually operated shifting device to control the shifting of the gear ratios.

The present invention contemplates to incorporate a free wheeling device, such as one-way clutch, into a conventional countershaft transmission to permit shifting from a lower speed to a higher speed without disconnecting a lower speed gear so that a considerable number of parts and control means are eliminated to provide a power transmission having simplified construction. Further, the transmission of the present invention is intended to utilize a control system in combination with an improved manual shifting device for thereby effecting shifting between a plurality of gear ratios either automatically or manually.

Figure 3:
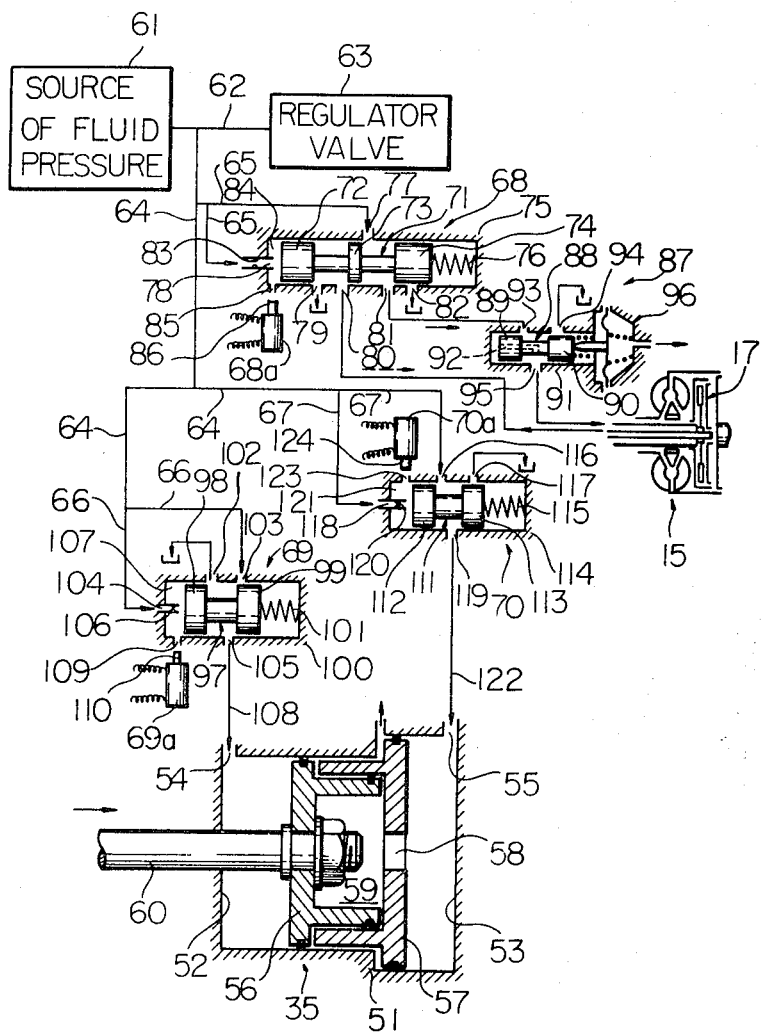
FIG. 3 is a schematic view of a hydraulic control system to actuate a servo motor shown in FIG. 1.
Figure 6A:
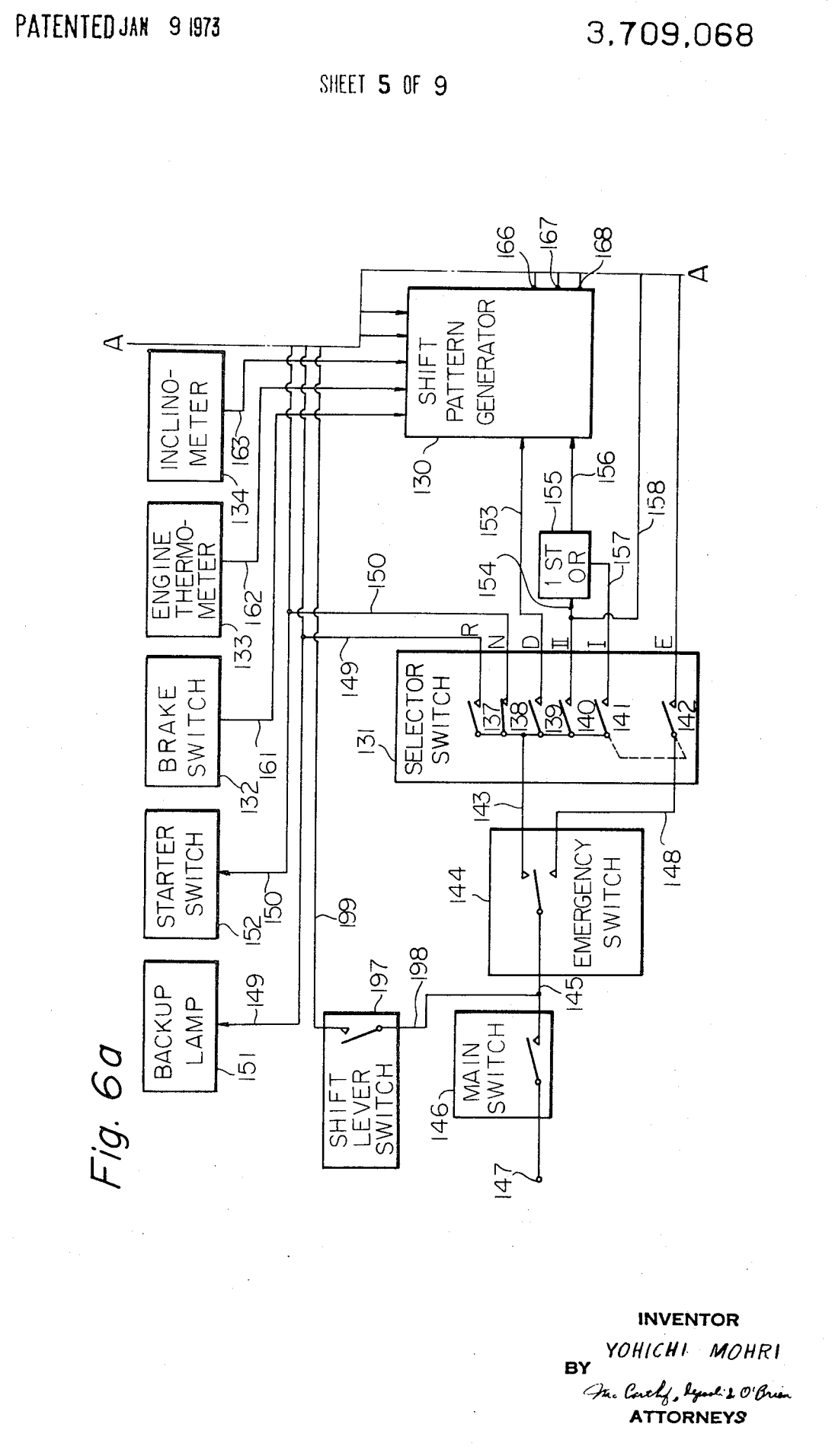
Figure 7:
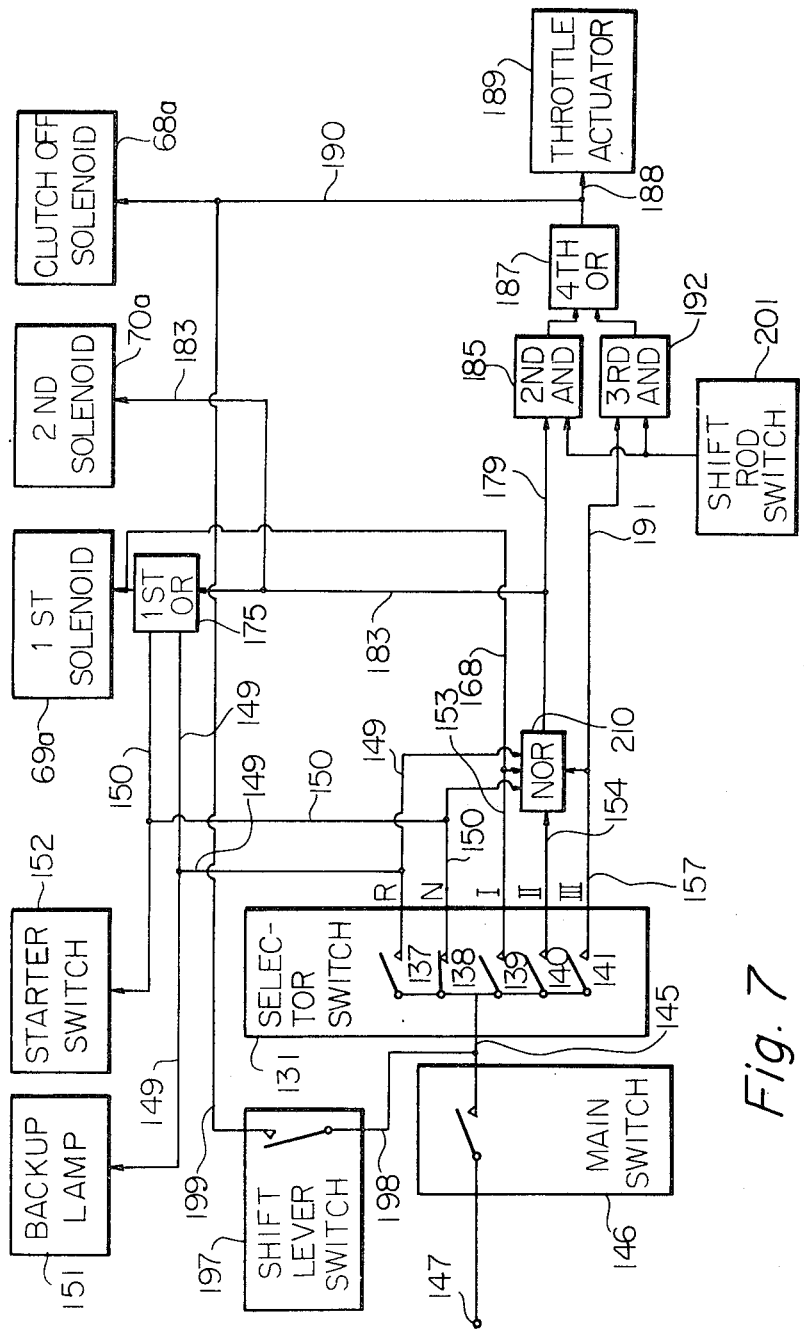
Figure 8:
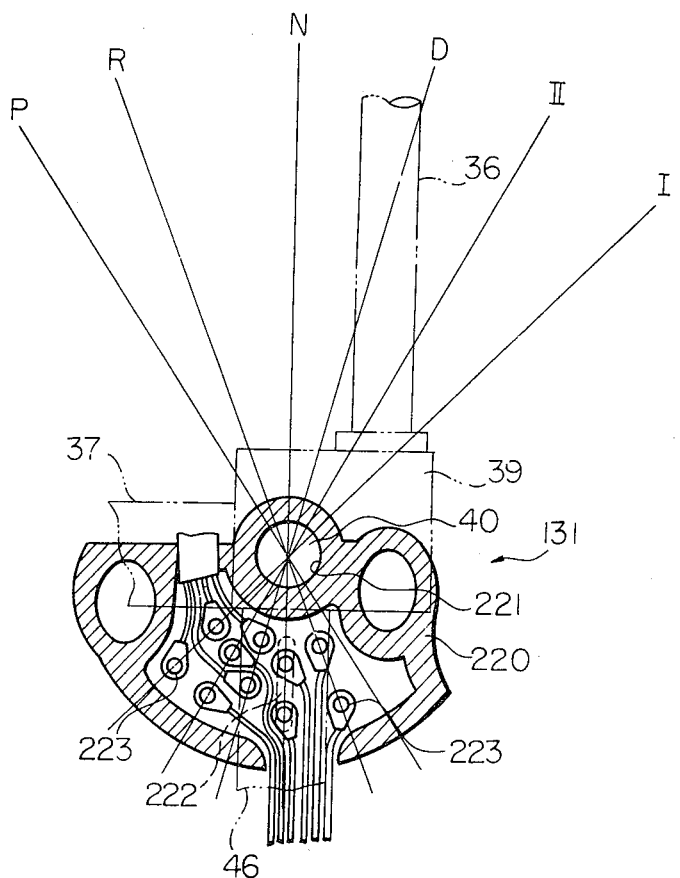
Figure 10A:
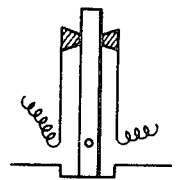
Figure 10B:
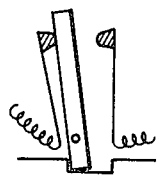
Figure 9:
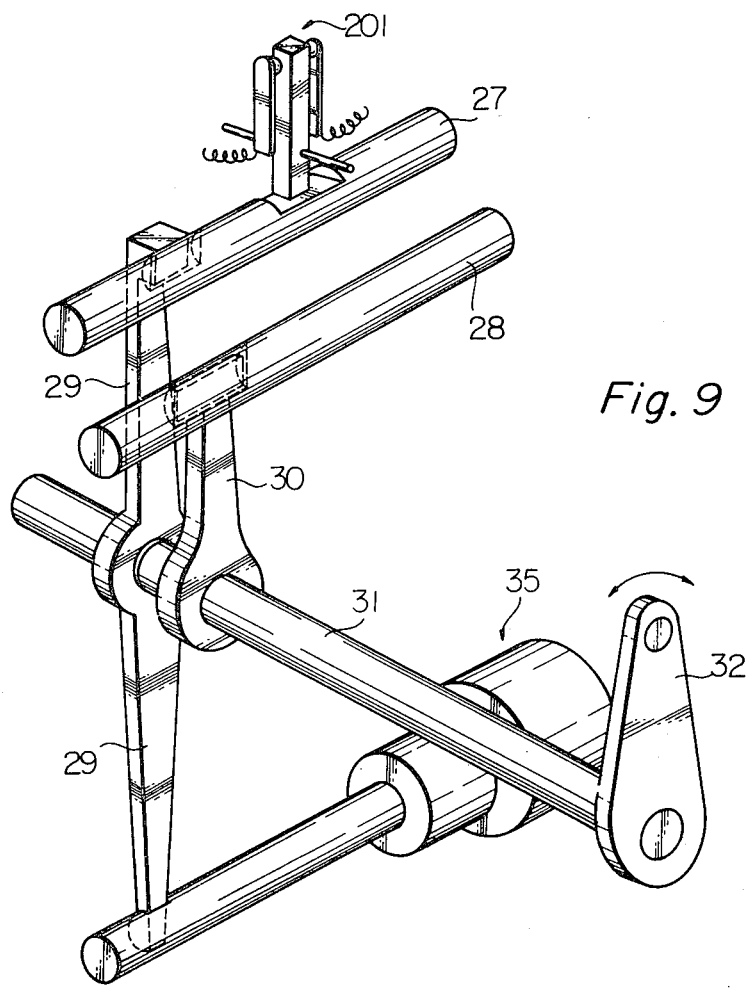

FIG. 6 formed by FIGS. 6a and 6b in combination is a schematic view of an electronic control system for controlling solenoids shown in FIG. 3;

FIG. 7 is a schematic view of a modified form of an electronic control system shown in FIG. 6;

FIG. 8 is a schematic view illustrating an example of a selector switch shown in FIG. 6; and FIG. 9 is a schematic view showing an example of a shift rod switch shown in FIG. 6; and FIGS. 10a and 10b are schematic views showing the ON-OFF positions of the shift rod switch shown in FIG. 9.

Figure 1:
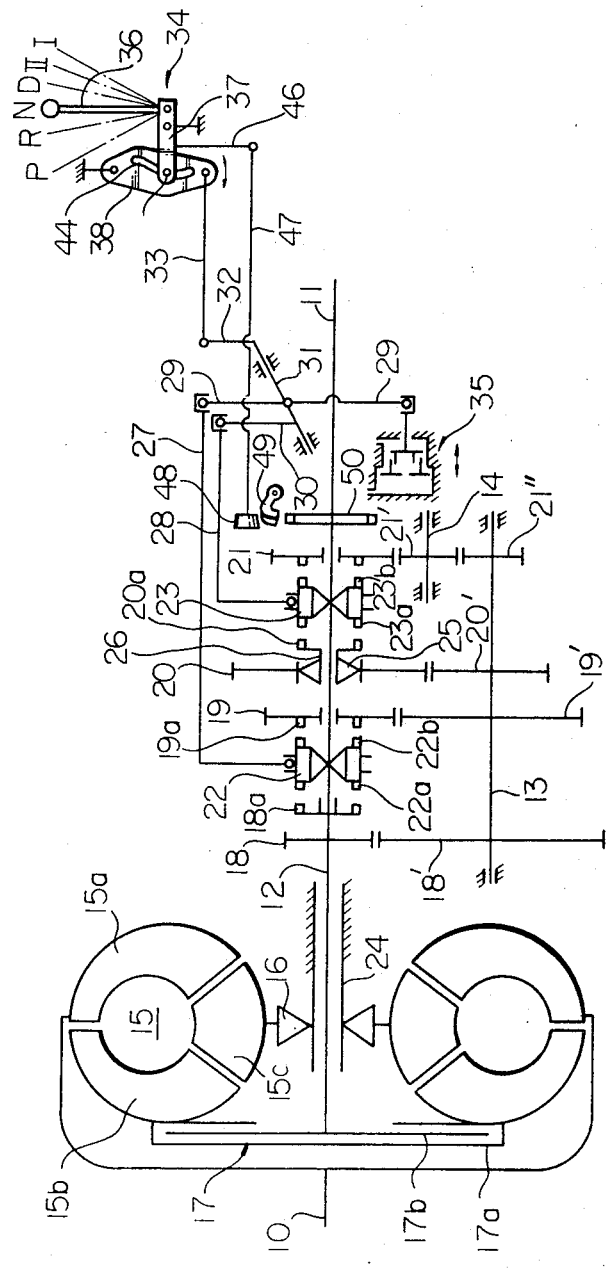
FIG. 1 is a schematic view of a multiple speed power transmission embodying the invention.

Referring now to FIG. 1, the transmission is illustrated to comprise a drive shaft 10 and a driven shaft 11. The drive shaft 10 is connected to and driven by a suitable vehicle engine such as an internal combustion engine (not shown). The driven shaft 11 is connected to the driving wheels (not shown) of the motor vehicle. The transmission also comprises a turbine or intermediate shaft 12 and countershafts 13 and 14. The turbine shaft 12 is positioned in line with the shafts 10 and 11 while the countershafts 13 and 14 are positioned in spaced relation with the shafts 10 and 11. The intermediate shaft 12 has a terminal portion into which one end of the driven shaft 11 is slidably disposed. The transmission also comprises a hydraulic torque converter 15 with a one-way brake 16, a fluid pressure operated friction clutch 17, a main drive gear 18, a second speed gear 19, a low speed gear 20, a reverse drive gear 21, and first and second dog clutches 22 and 23.

The hydraulic torque converter 15 comprises, as customary, a pump or driving element 15a, a turbine or driven element 15b and a stator 15c. The pump 15a is connected to the drive shaft 10, and the turbine 15b is associated with the fluid pressure operated friction clutch 17. The stator 15c is rotatably mounted on a hollow shaft 24, and the one-way brake 16 is mounted between the stator 15c and the hollow shaft 24.

The friction clutch 17, being of conventional design and construction, is shown in FIG. 1 to comprise a casing 17a and a friction disc 17b, and is so arranged as to selectively interrupt a drive connection between the drive shaft 10 and the intermediate shaft 12 when shifting from one gear ratio to another whereby a smooth shifting is effected. The casing 17a is connected to and for rotation with the turbine 15b of the torque converter 15, while the friction disc 17b is connected for rotation with the intermediate shaft 12.

The one-way brake 16 may be of any suitable construction and is so arranged as to allow a free rotation of the stator 15c only in the forward direction of the vehicle, that is, in the direction in which the drive shaft 10 rotates and not in the reverse direction.

The main drive gear 18, which has clutch teeth 18a, is fixed on the intermediate shaft 12, and is in constant mesh with a gear 18' mounted on the countershaft 13. The gears 19, 20 and 21, which have clutch teeth 19a, 20a and 21a, respectively, are rotatably disposed on the driven shaft 11 and constantly mesh with gears 19', 20' and 21', respectively. The gears 19' and 20' are secured to the countershaft 13, while the gear 21' is fixed on the countershaft 14 and meshes with a gear 21'' mounted on the countershaft 13.

The dog clutch 22, which may be of conventional construction, includes clutch teeth 22a and 22b, and is slidably splined to the driven shaft 11. The dog clutch 22 is selectively moved into engagement with either the teeth 18a or the teeth 19a by control means as will be discussed in detail.

Likewise, the dog clutch 23 includes clutch teeth 23a and 23b, and is slidably splined to the driven shaft 11. The dog clutch 23 is adapted to move into engagement with either the teeth 20a or the teeth 21a.

A free wheeling device 25 is arranged in the power transmission between the low speed gear 20 and the dog clutch 23 whereby extra parts and control means to actuate the dog clutch 23 are eliminated and accordingly not only the transmission can be arranged into simple construction but the control system therefore is made simple in construction and reliable in operation. In particular, the free wheeling device 25 is operatively provided between the low speed gear 20 and a hollow shaft 26 connected to the clutch teeth 20a associated with the clutch teeth 23a of the dog clutch 23, and functions to allow free wheeling when the drive shaft 11 rotates at a speed higher than the low speed gear 20.

As shown in FIG. 1, the dog clutches 22 and 23 are controlled by shifting rods 27 and 28 which are connected to respective levers 29 and 30. The lever 30 is fixed on a shaft 31 while the lever 29 is slidably disposed on the shaft 31, the shaft 31 being connected at its end to a lever 32 which in turn is connected through a connecting rod 33 to a manually operated shifting device 34. The lever 29 is connected to a fluid pressure operated servo motor 35 as will be described in detail.

Figure 2:
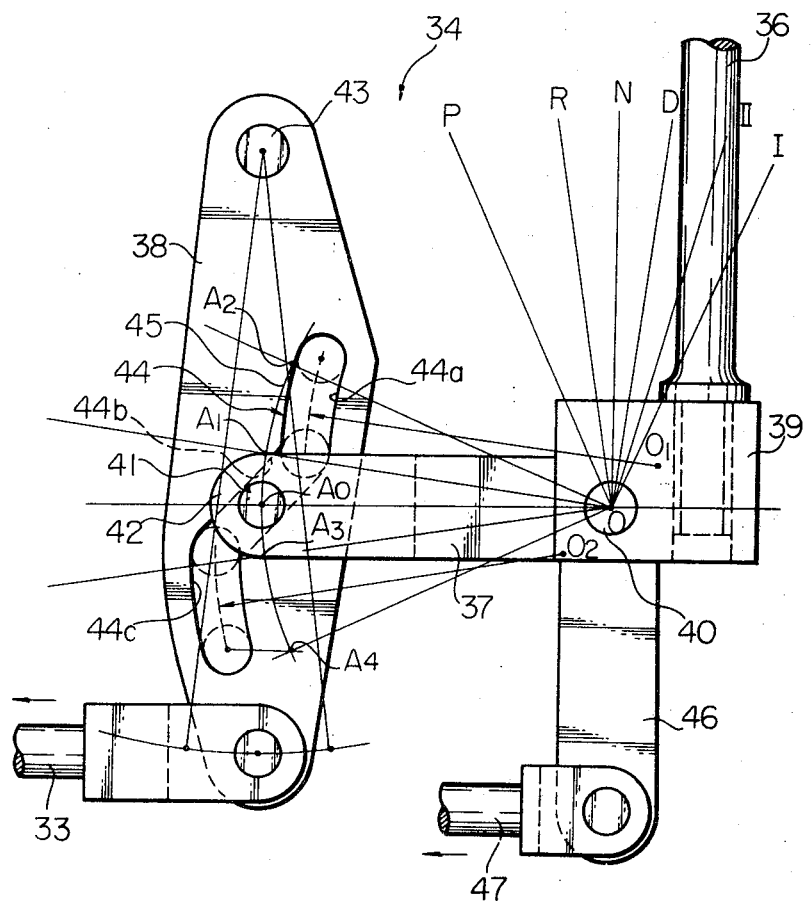
FIG. 2 is a view illustrating in detail a manual shifting device of the transmission shown in FIG. 1.

The shifting device 34 is illustrated in more detail in FIG. 2. As shown, the shifting device 34 has the following positions: P or parking position, R or reverse drive position, N or neutral position, D or automatic forward drive position, II or manual second speed position, land I or manual first speed position. The shifting device 34 includes a manually operated shift lever 36 having a shift lever switch (not shown), a control arm 37 and a cam plate 38. The shift lever switch is adapted to generate an electric signal when the shift lever 36 is gripped, the electric signal generated being applied to an electronic control system for actuating a clutch-off valve and a throttle valve actuator thereby to effect smooth shifting between the plurality of gear ratios, as will be described in detail. The shift lever 36 is secured to the end portion 39 of the control arm 37. The control arm 37 is pivoted at 40 and has a pin 41 at the other end portion 42 describing a circular path around the pivot 40. The cam plate 38 is mounted on a pivot 43 and has a slot 44 consisting of first, second and third portions 44a, 44b' and 44c. The first and third portions 44a and 44c are formed with same radii of curvature so as to cause the cam plate 38 to remain fixed when the pin 41 follows the circular path 45 around a point 0 or the pivot 40. The centers of curvature of the first and third portions 44a and 44c are eccentric with respect to each other to make the cam plate 33 fixed in different positions after the pin 41 has reached the first and third portions 44a and 44c, respectively. The second portion 44b is, however, so formed as to cause the cam plate 38 to rotate about the pivot 43 when the pin 36 moves along the circular path 45 about the point 0 in the second portion 44b. As illustrated, the cam plate 38 is pivotally connected to the connecting rod 33 as already discussed.

A parking lock arm 46 is secured to the end portion 39 of the control arm 37 and is operatively connected to a connecting rod 47 on which a cam 48 is provided. The cam 48 is associated with a pawl lever 49 to lock a parking gear 50 and accordingly the driven shaft 11 against rotation in either direction.

The shift lever is shown in FIG. 2 to be set in the neutral position. As the shift lever 36 is moved from the N position to the D position, the control arm 37 rotates clockwise, and the pin 41 follows the circular path $A_0$–$A_{1a}$. At this instant, the pin 41 moves in the second portion 44b, so that the cam plate 38 rotates clockwise around the pivot 43 whereby the point $0_1$ is aligned with the point 0. With the cam plate 38 rotating clockwise, the pin 41 moves the cam plate 38 so that the connecting rod 33 is moved leftwardly. It follows that the lever 32, shaft 31 and shifting rod 28 operate in a manner to engage the dog clutch 23 with the low gear 20. Thus, the transmission is set in the D position. Since, in this condition, the center of curvature of the first portion 44a is aligned with the center of the pivot 40, that is the point 0, the cam plate 38 remains unchanged even if the shift lever 36 is moved from the D position to the II or I position, and accordingly the shift rod 28 remains fixed.

In addition, when the shift lever 36 is moved from the N position to the R position, the pin 41 follows the circular path $A_0$–$A_3$ and accordingly the point $0_2$ is aligned with the point 0. In this instance, the pin 41 moves in the second portion 44b counterclockwise, so that the dog clutch 23 engages with the reverse drive gear 21 for thereby providing the reverse drive ratio.

When the shift lever 36 is further moved from the R position to the P position, the pin 41 moves along the circular path $A_3$–$A_4$ but the cam plate 38 remains fixed for the reason described above. However, the parking lock arm 46 fixed to the control arms 37 rotates counterclockwise, so that the connecting rod 47 is moved rightwardly, with the result that the cam 48 biases the pawl lever 49 which consequently engages with the parking gear 50 thereby to lock the driven shaft 11 against rotation in either direction.

As best seen in FIG. 3, the servo motor 35 includes a valve body 51 having formed therein bores 52 and 53, of which the bore 52 is smaller in cross section than the bore 53. The bores 52 and 53 communicate with ports 54 and 55. The second piston 57 is slidably fitted in the bore 53 and has an aperture 58 for providing communication between the bore 53 and a cavity 59. A piston rod 60 is rigidly connected to the first piston 56 and is operatively connected to the connecting lever 29 (see FIG. 1).

As previously described, the servo motor 35 is associated with a lever 29 connected to the shifting rod 27 for causing the dog clutch 22 to move into engagement with either the clutch teeth 18a of the main drive gear 18 or the clutch teeth 19a of the second speed gear 19 thereby to attain to second speed or high speed drive ratio. As the fluid pressure is passed to both of the bores 52 and 53 through the ports 54 and 55, the piston 56 is moved to the neutral position, that is, to the position as shown in FIG. 3. As the fluid pressure is passed only to the bore 52 through the port 54, the piston 56 is moved rightwardly of the drawing so that the second speed drive ratio is obtained. In contrast, as the fluid pressure is passed only to the bore 53 through the port 55, the piston 56 is moved leftwardly so that the dog clutch 22 engages with the clutch teeth 18a of the main drive gear 18 thereby to establish the high speed drive ratio. As the fluid pressure is supplied to neither the bore 52 nor the bore 53, the piston 56 is made manually movable by an additional shift lever (not shown) connected to the piston rod 60 for thereby manually effecting a shifting between a plurality of gear ratios.

The servo motor 35 thus constructed is controlled by a hydraulic control system shown in FIG. 3. The hydraulic control system includes a source 61 of fluid pressure which supplies a fluid under pressure to a fluid pressure conduit 62. The fluid pressure conduit 62 communicates with a line pressure regulator valve 63. The line pressure regulator valve 63, which may be of any known construction, communicates with a line pressure conduit 64 and operates in a manner well known to regulate the fluid pressure in the line pressure conduit 64 having branch conduits 65, 66 and 67 each communicating with a clutch-off valve 68, a first shift valve 69 and a second shift valve 70.

The clutch-off valve 68 includes a valve spool 71 having spaced lands 72, 73 and 74, the valve spool 71 being slidably disposed in a bore (not identified) in a valve body 75. A spring 76 biases the valve spool 71 leftwardly of the drawing. The clutch-off valve 68 has a plurality of ports 77, 78, 79, 80, 81 and 82. The port 77 communicates with the branch conduit 65. The port 78, which has an orifice 83 therein, also communicates with the branch conduit 65 and communicates with a control chamber 84. A nozzle 85 extends from the control chamber 84 and is normally opened to exhaust the fluid in the control chamber 84. As shown, the clutch-off valve 68 is operated by a solenoid motor 68a. An armature 86 of the solenoid motor 68a is positioned opposite to the end of the nozzle 85 to control the movement of the valve spool 71. The ports 79 and 82 are drain ports. The port 80 communicates with the releasing side of the friction clutch 17 while the port 81 communicates with the friction clutch 17 through modulator valve 87. The clutch-off valve 68 thus constructed functions to interrupt the drive connection between the drive shaft 10 and the intermediate shaft 12 during shifting by energizing the solenoid motor 68a for thereby effecting a smooth shifting. The solenoid 68a is energized by the electric signal delivered from the shift lever switch as already described.

The modulator valve 87 includes a valve spool 88 having spaced lands 89 and 90. The valve spool 88 is slidably disposed in a bore of a valve body 91. The valve spool 88 has an aperture 92 therein for communicating one valve chamber with another valve chamber, as shown in FIG. 3. The modulator valve 87 has a plurality of ports 93, 94 and 95. The port 93 communicates with the port 81 of the clutch-off valve 68 and the port 95 communicates with a pressure-applying side of the friction clutch 17. The port 94 is a drain port. As illustrated in FIG. 3, the modulator valve 87 cooperates with a diaphragm assembly 96, which responds to an intake manifold vacuum of the engine to modulate the fluid pressure applied to the clutch 17 thereby to prevent shocks from occurring when the friction clutch is coupled.

The first shift valve 69 includes a valve spool 97 having spaced lands 98 and 99. The valve spool 97 is slidably disposed in a bore of a valve body 100. A spring 101 urges the valve spool 97 leftwardly of the drawing. The shift valve 69 has ports 102, 103, 104 and 105. The port 102 is a drain port from which the fluid is drained off. The port 103 communicates with the branch conduit 66. The port 104, which has an orifice 106 therein, communicates with the branch conduit 66 and a control chamber 107. The port 105 communicates with a conduit 108 which in turn communicates with the servo motor 35. A nozzle 109 extends from the control chamber 107 and is normally opened to drain the fluid in the control chamber 107. As shown, the shift valve 69 is operated by a solenoid 69a having an armature 110. The armature 110 is positioned opposite to the end of the nozzle 109 to control the movement of the valve spool 97 thereby to establish and interrupt the communication between the ports 103 and 105.

Likewise, the second shift valve 70 includes a valve spool 111 having spaced lands 112 and 113. The valve spool 111 is slidably disposed in a bore of a valve body 114. A spring 115 biases the valve spool 111 leftwardly of the drawing. The shift valve 70 has ports 116, 117, 118 and 119. The port 116 communicates with the branch conduit 67. The port 117 is a drain port. The port 118, which has an orifice 120 therein, also communicates with the branch conduit 67 and with a control chamber 121. The port 119 communicates with a conduit 122 which in turn communicates with the servo motor 35. A nozzle 123 extends from the control chamber 121 and is normally opened to discharge the fluid in the control chamber 121. As shown, the second shift valve 70 is operated by a solenoid 70a having an armature 124. The armature 124 is positioned opposite to the end of the nozzle 123 to control the movement of the valve spool 111 thereby to selectively establish and interrupt the communication between the ports 116 and 119.

The solenoids 69a and 70a for the shift valves 69 and 70, respectively, are operated by the electronic control system as will be described in detail with reference to the program indicated in the following Table wherein "+" denotes that the solenoids and shift valves coacting therewith are energized to effect any given gear range and "−" denotes that the solenoids and shift valves coacting therewith are de-energized.

TABLE

|   |   | 1st Solenoid 69a | 2nd Solenoid 70a |
|---|---|---|---|
| P |   | − | − |
| R |   | + | − |
| N |   | + | − |
| D | 1 | + | − |
|   | 2 | + | + |
|   | 3 | − | − |
| II |   | + | + |
| I |   | + | − |

When in operation, the shift lever 36 is set to the P position, both the solenoids 69a and 70a are de-energized as shown in Table, so that the armatures 110 and 124 are caused to retract to open the nozzle 109 and 123, respectively. Consequently, the valve spools 97 and 111 are moved leftwardly by the actions of the springs 101 and 115. In this instance, the port 116 communicates with the port 119, thereby passing the fluid pressure over to the port 55 through the conduit 122. The communication between the ports 103 and 105 is interrupted by the land 99 of the first shift valve 69, so that the fluid pressure is absent in the conduit 108. This causes the piston 56 of the servo motor 35 to move leftwardly of the drawing (see FIG. 3) thereby rotating the connecting lever 29 counterclockwise (see FIG. 1), so that the dog clutch 22 engages with the main drive gear 18. In this instance, however, the pin 41 is set in the third portion 44c of the slot 44, so that the cam 48 urges the pawl lever 49 thereby to lock the driven shaft 11 against rotation in either direction.

When the shift lever 36 is set to the "R" position, the solenoid 69a is energized with the solenoid valve 70a kept de-energized, so that the armature 110 is caused to protrude to close the nozzle 109 while the armature 124 is kept retracted to open the nozzle 123. In this instance, the port 103 communicates with the port 105, thereby passing the fluid pressure over to the port 54 through the conduit 108. This causes the piston 56 of the servo motor 35 to move in the neutral position, that is, in the position as shown in FIG. 3, so that the dog clutch 22 is held in the neutral position. Since, in this instance, the pin 41 of the shift control means 34 stays in the third portion 44c of the slot 44, the dog clutch 23 engages with the reverse drive gear 21. Thus, the reverse drive ratio is obtained.

When the shift lever 36 is set to the N position, the solenoid 69a is kept energized with the solenoid valve 70a kept de-energized, so that the servo motor 35 and accordingly the dog clutch 22 stays in the neutral position. In this instance, however, the pin 41 of the shift control means 34 is set in the second portion 44b of the slot 44, so that the shifting rod 28 is moved to the position where the dog clutch 23 engages with neither the low speed gear 20 nor the reverse drive gear 21. Thus, the transmission is set in its neutral condition.

When the shift lever 36 is moved to the D position, the electronic control system operates to energize and de-energize the solenoids 69a and 70a in a manner indicated in the table, the forward speed range is obtained by shifting signals delivered to the solenoids 69a and 70a. In this instance, the pin 41 of the shift control means 34 is set in the first portion 44a of the slot 44, so that the dog clutch 23 engages with the low speed gear 20.

When the first speed shifting signal is generated by the electronic control system, the solenoid 69a is energized while the solenoid 70a is de-energized as shown in the table, so that the armature 110 is caused to protrude to close the nozzle 109 while the armature 124 is caused to retract to open the nozzle 123. In this instance, the port 103 communicates with the port 105, thereby passing the fluid pressure over to the port 54 through the conduit 108. Since, on the other hand, the port 116 communicates with port 119, thereby passing the fluid pressure to the port 55 though the conduit 122. Consequently, the piston 56 of the servo motor 35 is moved to the position illustrated in FIG. 3, so that the dog clutch 22 is held in the neutral position as shown in FIG. 1. Since, in this instance, the dog clutch 23 engages with the low speed gear 20 as already described, the turbine torque built up by the torque converter 15 is then distributed through the shaft 12, engaged gears 18 and 18', countershaft 13, engaged gears 20 and 20', and engaged clutch 23 to driven shaft 11 of the motor vehicle, and thus the forward low speed drive is built up.

As the vehicle speed increases to the shifting point from the first to the second speed drive ratio, then both the solenoids 69a and 70a are energized, so that the armatures 110 and 124 are caused to protrude to close the nozzles 109 and 123. In this instance, the communication between the ports 116 and 119 is interrupted by the land 112 of the valve spool 111, so that the fluid pressure is absent in the conduit 122 while the port 107 communicates with the port 105 thereby to pass the pressure to the port 54 through the conduit 108. Consequently, the piston 56 of the servo motor 35 is moved rightwardly of the drawing (see FIG. 3), so that the dog clutch 22 engages with the second speed gear 19. The torque delivered to the intermediate shaft 12 is then passed through the engaged gears 18 and 18', countershaft 13, engaged gears 19 and 19' and engaged dog clutch 22 to the driven shaft 11 of the vehicle, and thus the second speed drive ratio is established.

It is to be noted that, since the free wheeling device 25 is positioned between the low gear 20 and the dog clutch 23, upshifting from the low speed to the second speed drive ratio is effected without any controls to disconnect the dog clutch 23 from the low speed gear 20 and that a considerable number of parts to control the dog clutch 23 are eliminated and accordingly the control system is extremely simplified in construction.

As the vehicle speed further increases, both of the solenoids 69a and 70a are de-energized, so that the armatures 110 and 124 are caused to retract to open the nozzles 109 and 123, respectively. In this instance, the communication between the ports 103 and 105 is interrupted by the land 99 of the valve spool 97, so that the fluid pressure is absent in the conduit 108. On the other hand, the port 116 communicates with the port 119, thereby passing the fluid pressure to the port 55 through the conduit 122. Consequently, the piston 56 is moved leftwardly of the drawing, so that the connecting rod 29 is moved counterclockwise thereby to cause the dog clutch 22 to engage with the main drive gear 18. The turbine torque of the torque converter 15 is then directly distributed to the driven shaft 11 and thus the third speed drive is reached.

When the shift lever 36 is moved to the II position, both the solenoids 69a and 70a are energized, so that the piston 56 of the servo motor 35 is moved rightwardly as described above. Consequently, the dog clutch 22 engages with the second speed gear 19. Although the dog clutch 23 engages with the low speed gear 20, the second speed drive ratio is obtained without disconnecting the dog clutch 23 from the low speed gear 20 for the reason as already described.

When the shift lever 36 is set to the I position, the solenoid 70a is de-energized with the solenoid 69a kept energized, so that the piston 56 of the servo motor 35 is moved to the neutral position as already described. Consequently, the dog clutch 22 engages with neither the main drive gear 18 nor the second speed gear 19.

Since, in this instance, the pin 41 of the shift control means 34 is set in the first portion 44a of the slot 44, the dog clutch 23 engages with the low speed gear 20. The turbine torque delivered to the intermediate shaft is then passed through the engaged gears 18 and 18', countershaft 13, engaged gears 20 and 20' and engaged clutch 23 to the driven shaft 11. Thus, the low speed drive ratio is obtained.

Figure 4:
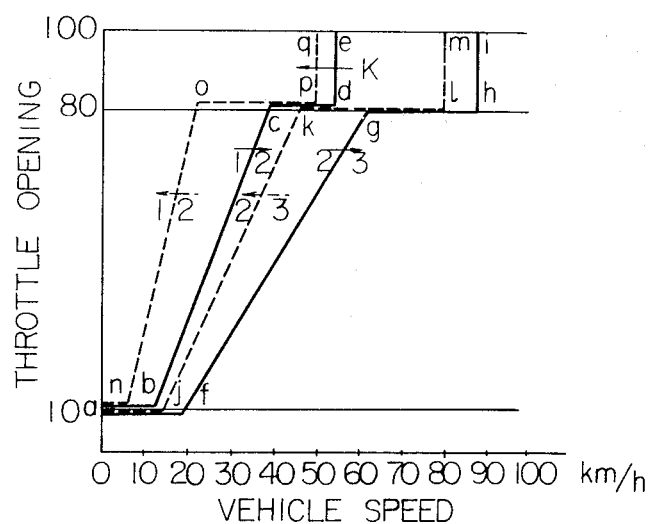
FIGS. 4 and 5 are examples of preferred shifting patterns attainable with the power transmission shown in FIG. 1.
Figure 5:
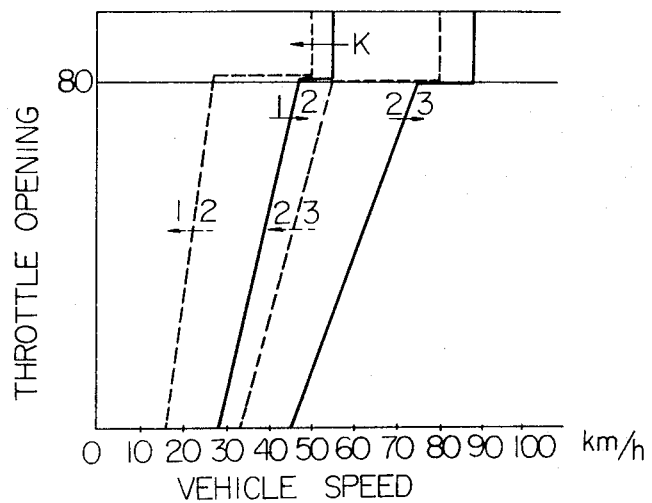

Preferred examples of the shift patterns which are available with use of the electronic control system are illustrated in FIGS. 4 and 5.

FIG. 4 represents the shift pattern attained when the vehicle is driven on a level road and FIG. 5 indicates the shift pattern which is attained when the vehicle is driven on an ascent or descent. In FIG. 4, the curve $a$–$b$–$a$;–$d$–$e$ indicates the shifting point at which a low speed drive ratio is shifted to intermediate and the curve $a$–$f$–$g$–$h$–$i$ indicates the shifting point at which the intermediate speed drive ratio is shifted to high, while the curve $a$–$j$–$k$–$l$–$m$ indicates the shifting point at which the high speed drive ratio is shifted to intermediate and the curve $a$–$n$–$o$–$p$–$q$ indicates the shifting point at which the intermediate speed drive ratio is shifted to low. When the vehicle runs on the level road, the electronic control system generates the shifting signals for the low, intermediate and high speed drive ratios in accordance with the shift patterns shown in FIG. 4.

FIG. 5 illustrates how the shift pattern is varied so as to raise the shifting point to a higher vehicle speed when the vehicle runs on an ascent, when brake is applied to the engine while the vehicle is running on a descent, and when the engine is operating at a low temperature.

Referring next to FIGS. 6a and 6b, there is shown in a block form the electronic control system which is adapted to control the solenoids 69a and 70a for effecting a desired gear ratio in accordance with the shift patterns illustrated in FIGS. 4 and 5. The electronic control system largely comprises a shift pattern generator unit 130. The shift pattern generator unit 130 is controlled by various parameters; the position of the selector switch, the position of the brake pedal, the temperature of the engine, the inclination of the motor vehicle body, the angular position of the throttle valve, and the speed of the motor vehicle. To this end, the shift pattern generator unit 130 cooperates with a selector switch 131, a brake switch 132, an engine thermometer 133, an inclinometer 134, a throttle opening sensor 135 and a vehicle speed sensor 136.

The selector switch 131 includes a plurality of manually operable contact pairs 137, 138, 139, 140, 141 and 142, each corresponding to a transmission range, that is, reverse, neutral, automatic forward drive, second speed hold, first speed hold or first speed hold for an emergency. The movable contacts of the contact pairs 137, 138, 139, 140 and 141 are connected through a line 143, a first stationary contact of an emergency switch 144, a line 145 and a main switch 146 to a source of power supply 147. The movable contact of the contact pair 142 is connected to a second stationary contact of the emergency switch 144 through a line 148. The first stationary contact of the emergency switch 144 is adapted to be normally closed, while the second stationary contact thereof is closed only when the electronic control system fails during operation. The respective stationary contacts of the contact pairs 137 and 138 of the selector switch 131 are connected through lines 149 and 150 to a backup lamp 151 and a starter switch 152, respectively. The stationary contact of the contact pair 139 is connected through a line 153 to the shift pattern generator unit 130. The stationary contact of the contact pair 140 is connected through a line 154 to the input terminal of a first OR gate 155 which in turn is connected to the shift pattern generator unit 130 through a line 156. The stationary contact of the contact pair 141 is also connected to the input terminal of the first OR gate 155 through a line 157. The line 154 is connected through a line 158 to the input terminal of a first AND gate 159. The stationary contact of the contact pair 142 is connected through a line 160 to the first solenoid 69a.

The shift pattern generator unit 130 is connected not only to the selector switch 131 but to the brake switch 132 through a line 161, to the engine thermometer 133 through a line 162, to the inclinometer 134 through a line 163, to the throttle valve opening sensor 135 through a line 164 and to the vehicle speed sensor 136 through a line 165.

The brake switch 132 is adapted to generate a voltage signal only when the brake pedal, not shown, is depressed. The engine thermometer 133 detects the temperature at which the engine operate and generates a voltage signal corresponding to the detected temperature. The inclinometer 134 detects an inclination of the vehicle body when the vehicle runs on an ascent or descent and generates a voltage signal corresponding to the inclination detected. The throttle valve opening sensor 135 detects an opening position of the throttle valve (not shown) and generates a voltage signal corresponding to the open area of the throttle valve as detected. The vehicle speed sensor 136 detects the revolution speed of the driven shaft 11 and generates a voltage signal corresponding to the detected speed. Each of thus generated voltage signals is applied to the shift pattern generator unit 130 through the lines 161, 162, 163, 164 and 165.

The shift pattern generator unit 130 is adapted to produce the shift patterns, as illustrated in FIGS. 4 and 5, for the preferred gear ratio.

The transmission is adapted to be set at a high speed drive ratio when an accelerator pedal, not shown, is released to decrease the opening of the throttle valve to below ten percent of its full opening while the vehicle is standing. In this condition, creep of the vehicle can be avoided because less torque is transmitted to the driven shaft 11 from the engine because of its low speed reduction ratio. If the accelerator pedal is depressed in such condition, the transmission is shifted from the high speed drive ratio to the low speed drive ratio at the point $a$ of FIG. 4. As the voltage signal is applied to the shift pattern generator unit 130 from the brake switch 132, engine thermometer 133 or the inclinometer 134, the shifting point is changed to a higher vehicle speed. When, however, the accelerator pedal is depressed for rapid acceleration under certain circumstances, the transmission causes a kick-down and the shifting point is changed to a higher vehicle speed. Thus, the shift pattern generator unit 130 produces the shifting signals for the low, second and high speed drive ratios in accordance with the varying driving conditions of the vehicle, which signals appear at one of first, second and third terminals 166, 167 and 168 of the shift pattern generator unit 130.

The first terminal 166 is connected through a line 169 to a first differentiator circuit 170 which in turn is connected through a line 171 to the input terminal of a second OR gate 172, the output terminal thereof being connected through a line 173 to a timer 174. The first terminal 166 is also connected through the line 169 to the input terminal of a third OR gate 175 which in turn is connected through a line 176 to the first solenoid 69a. The third OR gate 175 is also connected to the selector switch 131 through the lines 149 and 150. The first terminal 166 is further connected through a line 177 to the input terminal of the first AND gate 159. The output terminal of the first AND gate 159 is connected through a line 178 to a line 179 leading from the second terminal 167 of the shift pattern generator unit 130. The line 179 is connected through a line 180 to a second differentiator circuit 181 which in turn is connected through a line 182 to the input terminal of the second OR gate 172. The line 179 leading from the second terminal 167 is connected through a line 183 to the second solenoid 70a and through a line 184 to the input terminal of the third OR gate 175 connected to the first solenoid 69a. The line 179 is also connected to the input terminal of a second AND gate 185 which in turn is connected through a line 186 to the input terminal of a fourth OR gate 187. The output terminal of the fourth OR gate 187 is connected through a line 188 to a throttle valve actuator 189 and through a line 190 to the clutch-off solenoid 68a. The throttle valve actuator 189 may be of any known construction so far as the throttle opening is decreased thereby, when it is actuated, for thereby preventing the engine from operating at too high a speed. The third terminal 168 is connected through a line 191 to the input terminal of a third AND gate 192 the output terminal of which is connected through a line 193 to the input terminal of the fourth OR gate 187. The third terminal 168 is also connected through a line 194 to a third differentiator circuit which in turn is connected through a line 196 to the input terminal of the second OR gate 172.

In order to actuate the clutch-off solenoid 68a and the throttle valve actuator 189 for thereby effecting a smooth shifting, a shift lever switch 197 is provided which is associated with the shift lever 36. The shift lever switch 197 is adapted to be closed only when the shift lever 36 is grasped to effect the shift, for thereby actuating the clutch-off solenoid 68a and the throttle valve actuator 189. Consequently, when the shift lever 36 is released, the shift lever switch 194 is opened so that the clutch-off valve 68a is de-energized to couple the friction clutch 17 while the throttle valve is moved into normally open condition.

The shift lever switch 197 is connected through a line 198 to the line 145 leading to the main switch 146. The shift lever switch 197 is also connected to the timer 174 through lines 199 and 200 and to the line 190 leading to the clutch-off valve 68a and the throttle valve actuator 189. The timer 174 is so arranged as to produce a rectangular pulse having a predetermined pulsewidth which is applied to the clutch-off solenoid 68a and the throttle valve actuator 189.

For detecting the position of the shifting rod 27 to control the actuation of the clutch-off solenoid 68a and the throttle valve actuator 189, a shift rod switch 201 is provided which is associated with the shift rod 27 operatively connected to the dog clutch 22. The shift rod switch 201 is mounted on the shifting rod 27, as will be described in detail in conjunction with FIG. 9, so as to generate a voltage signal when the shifting operation is not completed, for thereby actuating the clutch-off solenoid 68a and the throttle valve actuator 189.

When, in operation, the shift lever 36 is set to the P position, the dog clutch 23 is caused to engage with the reverse drive gear 21, while the cam 48 is moved to a position in which the pawl lever 49 engages with the parking lock gear 50 to lock the driven shaft 11 against rotation in either direction. In this instance, the main switch 146 is opened so that the electronic control system is rendered inoperative.

When the shift lever 36 is set to the R position, the contact pair 137 of the selector switch 131 is closed, so that the electric signal is applied not only to the backup lamp 151 but also to the input terminal of the third OR gate 175 through the line 149. The third OR gate 175 then produces a logic signal "1" at the output terminal thereof which signal is applied through the line 176 to the first solenoid 69a. Upon receipt of the logic signal "1," the first solenoid 69a is energized so that the servo motor 35 and accordingly the dog clutch 22 are maintained in their neutral position. In this instance, however, the dog clutch 23 engages with the reverse drive gear 21 by the action of the cam plate 38 coacting with shift lever 36, connecting rod 33 and the shifting rod 28, and thus the reverse drive ratio is established.

When the shift lever 36 is set to the N position, the contact pair 138 of the selector switch 131 is closed, so that an electric signal can be applied not only to the startor switch 152 but also to the input terminal of the third OR gate 175. Consequently, the starter switch 152 can be actuated to start the engine. On the other hand, the third OR gate 175 generates the logic signal "1" at the output terminal thereof which signal is applied to the first solenoid 69a so that the dog clutch 22 remains at neutral position. In this instance, the dog clutch 23 is set to the neutral position by the shift lever 36 so that the transmission is maintained in its neutral condition.

When the shift lever 36 is grasped to move the shift lever 36 to the D position, the shift lever switch 197 is closed, so that the electric signal is applied through the lines 199 and 190 to the clutch-off solenoid 68a and the throttle valve actuator 189. Consequently, the solenoid 68a is energized to disconnect the intermediate shaft 12 from the driven element 15b of the hydraulic torque converter 15 while the throttle valve actuator 189 is actuated to decrease the throttle opening for thereby decreasing the engine speed. When, in this instance, the shift lever 36 is moved to the D position, the contact pair 139 of the selector switch 131 is closed and the electric signal is applied through the line 153 to the shift pattern generator unit 130, while the dog clutch 23 engages with the low speed gear 20. When the vehicle is standing and the accelerator pedal is released, the shift pattern generator unit 130 produces the shift pattern of FIG. 4 for generating the high speed shifting signal, so that the first and second solenoids 69a and 70a are de-energized. Consequently, the shifting rod 27 and accordingly the dog clutch 22 engage with the main drive gear 18 to establish a direct drive for thereby decreasing the torque transmitted to the driven shaft 11, so that creep of a vehicle is prevented. If the voltage signal is applied to the shift pattern generator unit 130 from the brake switch 132, engine thermometer 133, inclinometer 134 and/or throttle opening sensor 135, then the shift pattern generator unit 130 produces the shift pattern of FIG. 5 for raising the shifting point to the higher vehicle speed, so that the first solenoid 69a is energized to cause the dog clutch 22 to remain in its neutral position. The low or first speed drive ratio is thus obtained.

As the vehicle speed increases to the shifting point from the first to the second speed drive ratio, the vehicle speed sensor 136 generates the voltage signal corresponding to the detected vehicle speed, which voltage signal is then applied to the shift pattern generator unit 130. The shifting signal for the second speed drive ratio then appears at the second terminal 167. This shifting signal is represented by the logic signal "1." The logic signal "1" appearing at the second terminal 167 is then applied through the lines 179 and 180, second differentiator circuit 181 and the line 182 to the input terminal of the second OR gate 172, which produces the logic signal "1" in the line 173. The logic signal "1" delivered to the line 173 is applied to the timer 174 where it is converted into a rectangular pulse having a predetermined pulsewidth. The pulse thus generated is then applied through the line 199 and 190 to the clutch-off solenoid 68a and the throttle valve actuator 189. At the same time, the signal appearing at the second terminal 167 is applied through the lines 179 and 183 to the second solenoid 70a and through the line 184 to the input terminal of the third OR gate 175. The third OR gate 175 then produces the logic signal "1" in the line 176, which signal is applied to the first solenoid 69a. Accordingly, the first and second solenoids 69a and 70a are energized so that the servo motor 35 is conditioned to cuase the dog clutch 22 to engage with the second speed gear 19.

It should be noted, in this instance, that the shift is effected from the low speed to the second speed drive ratio without disconnecting the dog clutch 23 from the low speed gear 20 since the low speed gear 20 becomes free wheeling by the action of the free wheeling device 25 positioned between the low speed gear 20 and the dog clutch 23.

On the other hand, the logic signal "1" appearing at the second terminal 167 is applied through the line 179 to the input terminal of the second AND gate 185 to which the logic signal "1" is also applied from the shift rod switch 201 through the line 202 unless the shifting operation is complete. Consequently, the second AND gate 185 generates the logic "1" output signal on the line 186 which is applied through the line 186 to the input terminal of the fourth OR gate 187. The fourth OR gate 187 then produces the output logic signal "1" in the line 188, the signal thus produced being applied to the throttle valve actuator 189 and to the clutch-off solenoid 68a through the line 190 so that the friction clutch 17 is disconnected and that the opening of the throttle valve is decreased while the shifting is effected. When the shifting operation is complete, the shift rod switch 198 becomes inoperative to provide the logic input signal "0" to the second AND gate 185 so that the second AND gate 185 produces the output logic signal "0" which is applied to the input terminal of the fourth OR gate 187. The fourth OR gate 187 then produces the logic "0" output signal on the line 188, and the clutch off solenoid 68a and the throttle valve actuator 189 are thus de-energized. Consequently, the friction clutch 17 is connected and the throttle valve is maintained under normally-open condition.

As the vehicle speed further increases, the shift pattern generator unit 130 generates the shifting signal, namely, the logic signal "1" for the high speed drive ratio at the third terminal 168. The logic signal "1" appearing at the third terminal 168 is then applied through the lines 191 and 194 to the third differentiator circuit 195 where it is converted into a pulse which is applied through the line 196 to the input terminal of the second OR gate 172. The second OR gate 172 then generates the output logic signal "1" in the line 173 which is applied to the timer 174 where it is converted into a rectangular pulse to actuate the clutch-off solenoid 68a and throttle valve actuator 189. The signal appearing at the third terminal 168 is, in this instance, not applied to the first and second solenoid 69a and 70a, so that the servo motor 35 is moved to a position in which the dog clutch 22 is caused to engage with the main drive gear 18. The shift rod switch 201 is rendered operative unless the dog clutch 22 completely engages with the main drive gear 18, so that the clutch-off solenoid 68a and the throttle valve actuator 189 is actuated to effect the smooth shifting. When the shifting operation is complete, the shift rod switch 201 becomes inoperative, and thus the high speed drive ratio is established.

When the shift lever 36 is set to the manual "1" position, the selector switch 131 closes the contact pair 141, so that the logical signal "1" is applied through the line 157 to the input terminal of the first OR gate 155. The first OR gate then generates the output logical signal "1" in the line 156, which signal is applied to the shift pattern generator unit 130. The shift pattern generator unit 130 then produces the shifting signal for the low speed drive ratio at the first terminal 166. This signal is applied to the input terminal of the third OR gate 175 through the line 168, with the third OR gate generating the output logic signal "1," which is applied through the line 176 to the first solenoid 69a. Consequently, the first solenoid 69a is energized so that the servo motor 35 is maintained in its neutral position. In this instance, the dog clutch 23 associated with the shift lever 36 is caused to engage with the low speed gear 20, and thus the low speed drive ratio is obtained. It should be noted, in this instance, that the clutch-off solenoid 68a and the throttle valve actuator 189 are actuated in response to the signal generated by the shift lever switch 197. The shift pattern generator unit 130 produces the shifting signal for the high or second speed drive ratio in accordance with the varying vehicle speeds. At this instant, the signal delivered to the line 156 is applied to the manual part (not identified) of the shift pattern generator unit 130 whereby the shifting is effected at the point of kick-down, as illustrated by the range K in FIGS. 4 and 5, and thus the downshift is smoothly effected in accordance with the reduction in the vehicle speed.

When the shift lever 36 is moved to the manual II position, the shift pattern generator unit 130 produces the shifting signal for the second speed drive ratio at the second terminal 167 so that the servo valve 35 and accordingly the dog clutch 22 are conditioned for the second speed drive ratio. The operations of the clutch-off solenoid 68a and the throttle valve actuator 189 are the same as in the case of the manual I position so that the detailed description thereof is omitted herein. Even if the first signal is generated by the shift pattern generator unit 130 when the vehicle is coasting or descending with the shift lever set to the manual II position, the first AND gate 159 operates, upon receipt of the signals appearing at the line 158 and the line 177, in a manner to generate the signal on the line 178 for thereby maintaining the transmission in its second speed drive ratio.

In the event the electronic control system fails, the emergency switch 144 is operated to open the electric circuit forming part of the electronic control system so that the first and second solenoids 69a and 70a are de-energized and the transmission is conditioned in the high speed drive ratio. It should be noted, however, that the first speed drive ratio is obtained by closing the contact pair 142 for the emergency to apply the shifting signal through the line to the first solenoid 69a.

A modified form of the electronic control system of FIG. 6 is schematically shown in FIG. 7, wherein corresponding parts are similarly numbered.

The difference of the FIG. 7 modification from that of FIG. 6 lies in the omission of shift pattern generator unit and brake switch, engine thermometer, inclinometer, throttle opening sensor, vehicle speed sensor and emergency switch corelating with the shift pattern generator unit. The electronic control system of FIG. 7 is more simplified in construction than that of FIG. 6. In the embodiment of FIG. 7, the corresponding gear ranges of the contact pairs 139 and 141 are substituted for the ranges I and III, respectively. A NOR gate 210 is provided in the electronic control system shown in FIG. 7 and positioned between the lines 150, 153, 154, 157, 168, 179 and 171. The NOR gate 210 is adapted to generate a second speed shifting signal at the output terminal thereof only when neither the first nor the third speed shifting signal is applied to the input terminal thereof. Otherwise, the constructions of FIGS. 6 and 7 are identical to each other and hence detailed description thereof is omitted hereinafter, except for the operation of the electronic control system of FIG. 7.

When the manual shift lever 36 is moved from the neutral position to the I position, the shifting rod 28 cooporating with the cam plate 38 is moved to a position in which the dog clutch 23 engages with the low speed gear 21. At this instance, the contact pair 139 of the selector switch 131 is closed to render the first solenoid 69a operative, however, the shifting rod 27 remains at neutral position since the first solenoid 69a is already energized by the closed contact pairs 138. During the operation of the shift lever 36, the shift lever switch 197 is closed, so that the clutch-off solenoid 68a and the throttle valve actuator 189 is actuated to effect smooth shifting.

When the shift lever 36 is moved to the II position, the contact pairs 140 of the selector switch 131 are moved into closed position so that the signal is applied to the first solenoid 69a and 70a. This prevents mulfunctions occurring when the both contact pairs become operative or inoperative. When the shift lever 36 is actuated, the clutch-off solenoid 68a and the throttle valve actuator 189 are actuated in response to the signal delivered from the shift lever switch 197, while the first and second solenoids are energized to cause the dog clutch 22 to engage with the second speed gear 19. In this instance, the second speed drive ratio is established without disconnecting the dog clutch 23 from the low speed gear 20 since the free wheeling device 25 permits the free wheeling of the low speed gear 20. As the shifting operation is complete, the shift rod switch 201 is opened so that the clutch-off solenoid 68a and the throttle valve actuator 189 are de-energized to connect the friction clutch 17 and to increase the throttle opening.

When the shift lever 36 is moved to the III position, the contact pair 141 is closed so that the first and second solenoids 69a and 70a are de-energized to cause the servo motor 35 to select the position that the dog clutch 22 engages with the main drive gear 18. Thus, the power transmission is conditioned to the high speed drive ratio. The operations of the friction clutch 17 and the throttle valve actuator 189 are the same as in the case of the range II and therefore the detail description is omitted herein.

FIG. 8 illustrates an example of the selector switch 130 shown in FIGS. 6 and 7. The selector switch 131 may be of any suitable construction and is illustrated, in this embodiment, to comprise a casing 220 which is secured to the suitable means (now shown). The casing 220 has a bore 221 in which the pivot 40 is slidably disposed. A movable contact 222 is provided on the parking lock arm 46 and associated with a plurality of stationary contacts 223 attached to the casing 220 to generate electric signals indicative of the selected positions, that is, R, N, D, II or I position. The electric signal generated is then applied to the electronic control system as already described and is utilized for controlling the solenoids 69a and 70a for effecting shifting between a plurality of gear ratios.

FIG. 9 illustrates an example of the shift rod switch shown in FIGS. 6 and 7. As seen from FIG. 9, the shift rod switch 201 is adapted to be mounted on the shifting rod 27 and associated therewith for generating an electric signal which is delivered to the electronic control system for controlling the clutch-off solenoid 68a and the throttle valve actuator 189 to provide smooth shifting. FIG. 10a indicates that the shift rod switch is in ON position while FIG. 10b indicates that the shift rod switch is in OFF position.

It should be understood thus that construction of the power transmission embodying the invention is quite simple, by virtue of the free wheeling device eliminating a considerable number of parts and control means which are otherwise required in a conventional power transmission. Moreover, it will be apparent that simplicity of the transmission herein described renders it not only less expensive to manufacture but less costly to maintain.

What is claimed is:

1. In a multiple speed power transmission for a motor vehicle driven by an engine and having a torque converter including a driving element and a driven element, the combination comprising, a drive shaft, a driven shaft, an intermediate shaft, a countershaft, main drive gear means connecting said intermediate shaft to said countershaft, a plurality of gear means provided on said countershaft and said driven shaft and meshing with each other, a plurality of clutch means engaged with said gear means for selectively providing a drive connection between said countershaft and said driven shaft thereby to provide a plurality of gear ratios, and a free wheeling means provided between one of said gear means and the clutch means engaged therewith, said free wheeling means permitting said driven shaft to rotate at a speed higher than the speed of rotation of said one of said gear means, whereby upshifting is effected without disconnecting said one of said clutch means from one of gear means engaging therewith.

2. The combination according to claim 1, further comprising a manually operated shifting device to shift one of said clutch means and having a plurality of shifting positions each corresponding to said plurality of gear ratios, a fluid pressure operated servo motor to select three different positions, and a control system for controlling said fluid pressure operated servo motor to thereby shift another one of said clutch means for selectively providing said plurality of gear ratios.

3. The combination according to claim 2, wherein said manually operated shifting device comprises a manually operated shift lever, a control arm rotatable about a first pivot and having a pin describing a circular path about said first pivot, and a cam plate rotatable about a second pivot and having a slot receiving said pin of said control arm, said slot including first, second and third portions, said first and third portions being formed with the same radii of curvature to cause said cam plate to remain fixed relative to said second pivot when said pin moves along said first and third portions, said second portion causing said cam plate to rotate around said second pivot when said pin moves along said second portion, whereby said plurality of gear ratios is selectively expected.

4. The combination according to claim 2, wherein said control system comprises a source of fluid pressure, first and second shift valve means operatively communicating with said source of fluid pressure for actuating said fluid pressure operated servo valve means, and first and second solenoid valve means associated with said first and second shift valve means, said first and second solenoid valve means being responsive to movement of said manually operated shifting device to control said first and second shift valve means for thereby selectively providing said plurality of gear ratios.

5. The combination according to claim 4, wherein said control system further comprises a selector switch engaged with said manually operated shifting device to generate a first signal, sensing means to sense varying driving conditions of said motor vehicle for generating a second signal corresponding to said varying driving conditions, and a shift pattern generating means electrically connected to said selector switch and said sensing means and responsive to said first and second signals for generating a third signal to control said solenoid valve means for thereby establishing said plurality of gear ratios.

* * * * *